July 1, 1958 — T. L. URQUHART — 2,841,390
OPERATING SYSTEM FOR MULTI-LEAF DOORS
Filed Oct. 12, 1953 — 8 Sheets-Sheet 1

INVENTOR.
THORNTON L. URQUHART.
BY

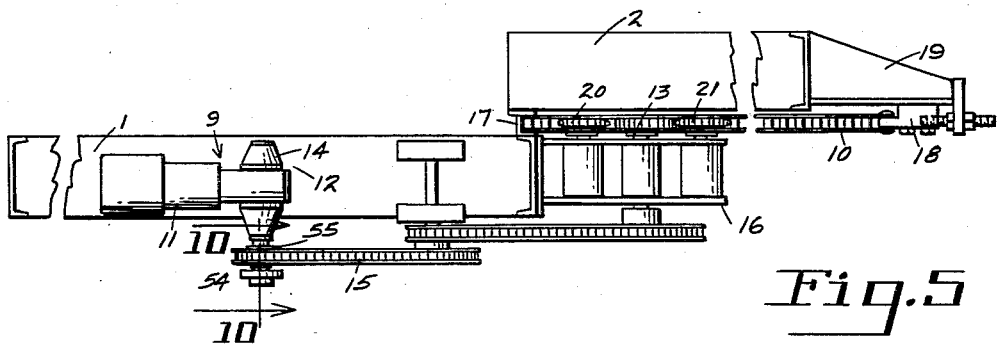
Fig.5
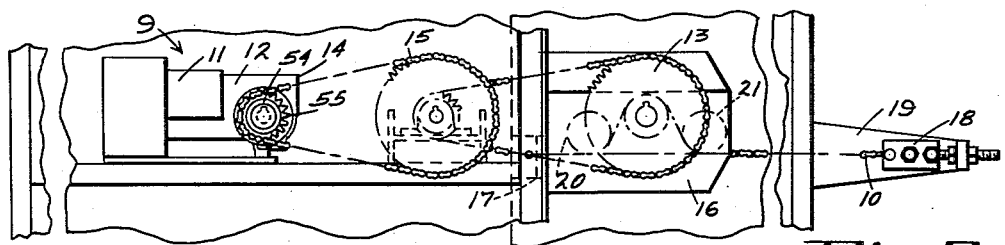
Fig.6
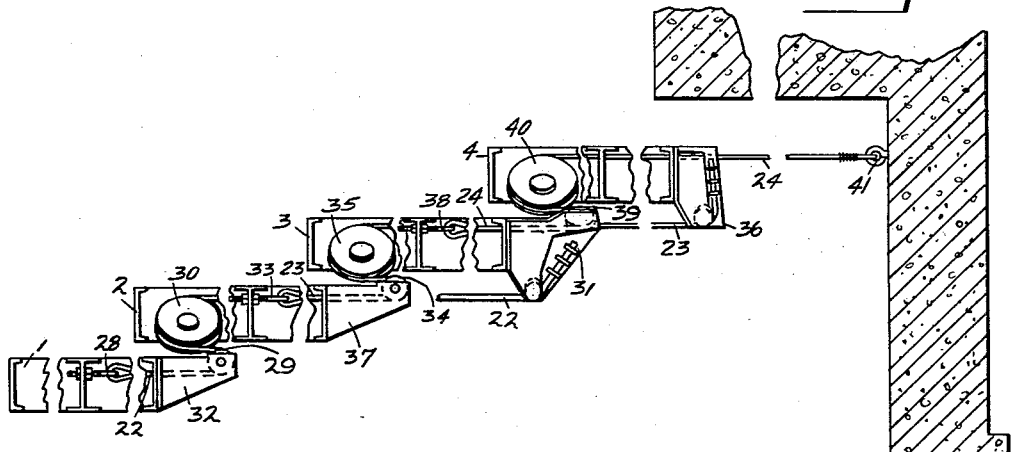
Fig.7
INVENTOR.
THORNTON L. URQUHART.
BY

July 1, 1958     T. L. URQUHART     2,841,390
OPERATING SYSTEM FOR MULTI-LEAF DOORS
Filed Oct. 12, 1953     8 Sheets-Sheet 3
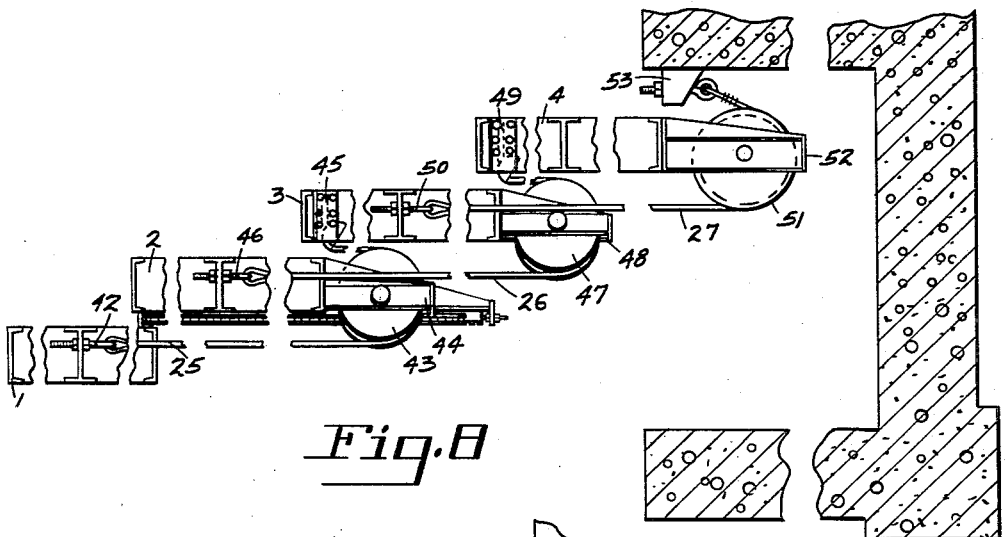
INVENTOR.
THORNTON L. URQUHART.

July 1, 1958

T. L. URQUHART 2,841,390

OPERATING SYSTEM FOR MULTI-LEAF DOORS

Filed Oct. 12, 1953

INVENTOR.
THORNTON L. URQUHART.
BY

INVENTOR.
THORNTON L. URQUHART.

July 1, 1958  T. L. URQUHART  2,841,390
OPERATING SYSTEM FOR MULTI-LEAF DOORS
Filed Oct. 12, 1953  8 Sheets-Sheet 6

INVENTOR.
THORNTON L. URQUHART.
BY

INVENTOR.
THORNTON L. URQUHART.

July 1, 1958 — T. L. URQUHART — 2,841,390
OPERATING SYSTEM FOR MULTI-LEAF DOORS
Filed Oct. 12, 1953 — 8 Sheets-Sheet 8

INVENTOR.
THORNTON L. URQUHART.

United States Patent Office 2,841,390
Patented July 1, 1958

2,841,390

OPERATING SYSTEM FOR MULTI-LEAF DOORS

Thornton L. Urquhart, Farmington, Mich., assignor to Byrne Doors, Inc., Ferndale, Mich., a corporation of Michigan Application October 12, 1953, Serial No. 385,464

2 Claims. (Cl. 268—51)

The invention relates to door operating systems and refers more particularly to mechanical systems for moving multi-leaf doors to open and closed positions.

Heretofore, relative wide, high openings, such as the entrance openings to airplane hangars, factories, warehouses and the like, have been closed by doors formed of a plurality of leaves which are movable on guides or tracks simultaneously differentially (that is, at different rates) to arrive simultaneously at fully open or fully closed positions. In one door operating system, the leaves have been moved by a single cable connected to the leaves and adapted to be wound on a drum of an operating mechanism mounted in the upper portion of or above the door pocket of the building. In another door operating system, the leaves have been moved by a series of cables connected to the leaves and an anchor in the pocket of the building and linear means located in the floor of the building below the leaves and connected to the lead leaf and operable by mechanism in the lower portion of or below the door pocket. In another door operating system, the leaves have been moved by a series of cables connected to the leaves and an anchor and operating mechanism connected to a supporting wheel of the lead leaf. The first of these constructions is open to the objection that at least that part of the building in the upper portion of or above the pocket is costly because it is necessary to build the same sufficiently strong to carry the weight of the operating mechanism and to take care of the stresses resulting from the movement of the leaves to open and closed positions. The second of these constructions is open to the objection that it can not be completely protected from dirt, rain, snow and the like falling into the slot providing for the connection between the linear member and the lead leaf of the door. The third of these constructions is open to the objection that the traction between the driven wheel and the track upon which the driven wheel rests varies considerably.

With my invention, these objectionable features are avoided by my providing an operating system which positively moves the leaves to open and closed positions and which is located between the upper and lower edges of the leaves. My invention also has for an object the provision of an operating system which is readily accessible. My invention has for another object the provision of an operating system having an improved operator.

With these and other objects in view, the invention resides in the novel features of construction and combinations and arrangements of parts as more fully hereinafter set forth.

In the drawings:

Figure 5 is an enlarged cross section on the line 5—5 of Figure 1;

Figure 6 is a side elevation of a portion of Figure 5;

Figures 7 and 8 are enlarged sectional views of the door opening cables and door closing cables respectively;

Figure 9 is a trailing edge elevation partly in section of Figures 7 and 8 combined;

Figure 1:
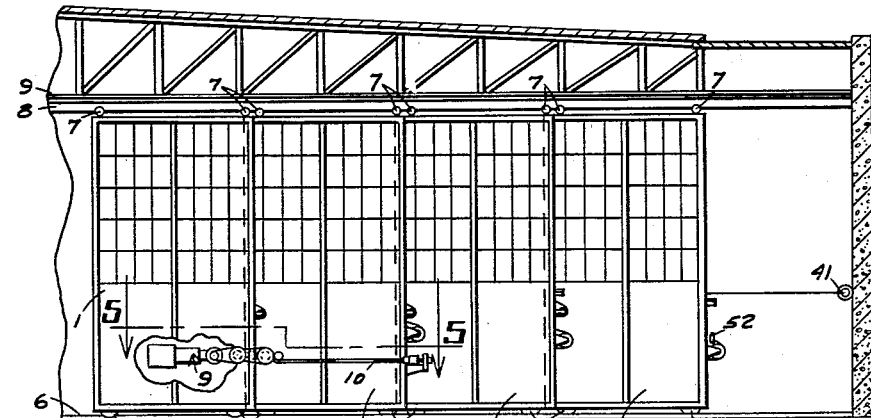
Figure 1 is an inside elevation of an airplane hangar having a door operating system embodying the invention.
Figure 2:
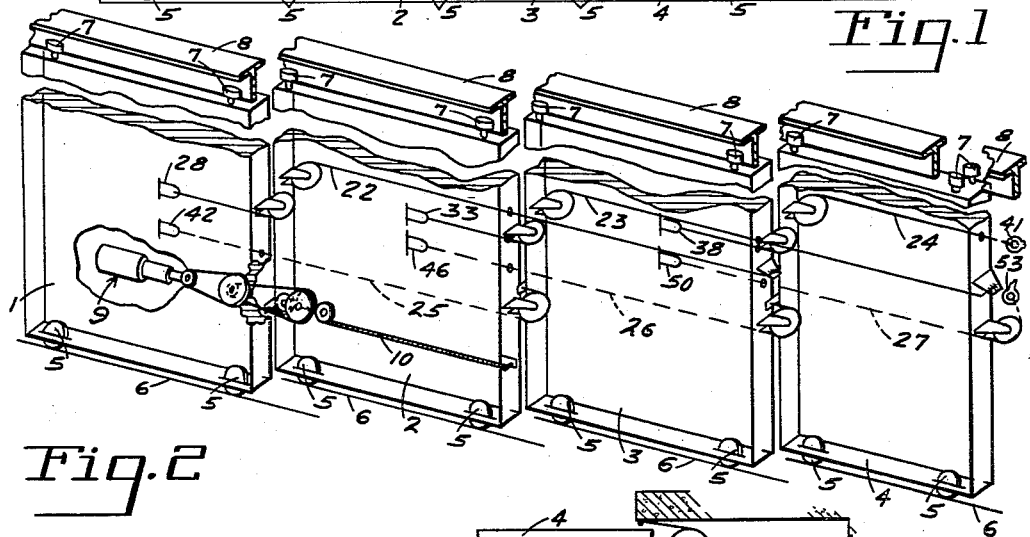
Figure 2 is a schematic inside elevation of the door and operating system.
Figure 4:
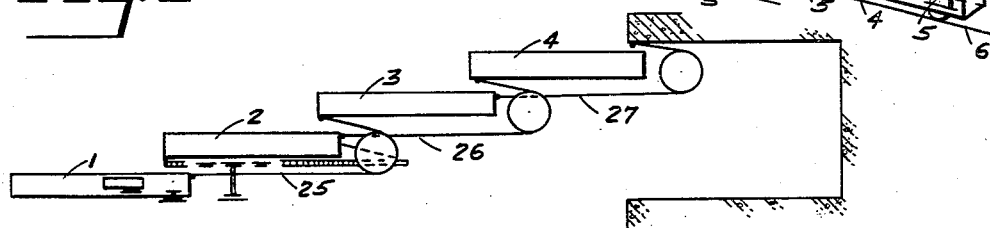
Figures 3 and 4 are schematic plan views of the door opening cables and door closing cables respectively which form part of the operating system.
Figure 3:
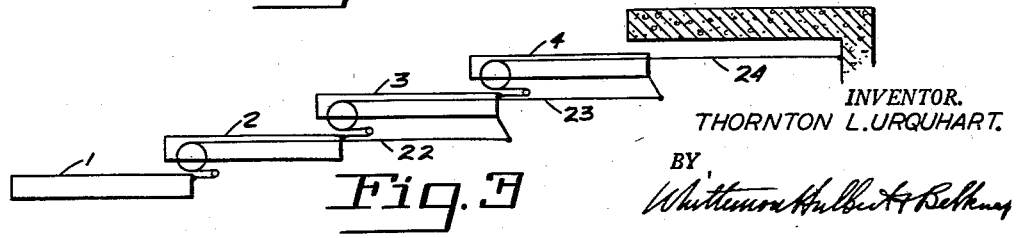

In the present instance, the operating system is designed for an airplane hangar door although it will be understood that the system may be used for doors of numerous other structures. The door may close the complete entrance opening of the airplane hanger, or one-half, or some other portion of the opening and the number of leaves forming the door may be varied to suit the requirements. As illustrated in Figures 1 to 10, inclusive, the door is adapted to close one-half of the entrance opening and comprises the leaves 1, 2, 3 and 4 of the same widths, the leaves 1 and 4 being the lead and trailing leaves respectively.

The leaves are preferably arranged within the building in upright parallel relation and they are transversely offset with respect to each other so that they may be moved relatively to each other to open and closed positions. When in closed position, the leaves are relatively extended and their adjacent ends overlap. When in open position, the leaves are arranged side by side or juxtaposed and their corresponding ends are in substantial transverse alignment.

The door leaves are provided at their lower edges with the wheels 5 which are movable over suitable tracks 6 in the floor of the airplane hangar and support the leaves. The door leaves are provided at their upper edges with the pairs of rollers 7 which engage the depending webs of the T-shaped head members 8 to thereby guide the upper edges of the leaves. These head members are suitably supported from the frame work of the building.

To move the leaves to open and closed positions, I have provided an operating mechanism for relatively moving the lead leaf 1 and the adjacent leaf 2, and a second mechanism dependent upon the relative movement of the leaves 1 and 2 for moving all of the leaves 1, 2, 3 and 4 to open and closed positions. Both mechanisms are preferably located approximately one-third the height of the opening from the floor.

The mechanism for relatively moving the leaves 1 and 2 comprises the drive unit 9 mounted on the lead leaf 1, and the linear member 10 mounted on the leaf 2 and in driving engagement with the drive unit. The drive unit comprises the electric motor 11, the speed reducing mechanism 12, and the drive sprocket wheel 13. The speed reducing mechanism comprises the gear device 14 connected to the motor and the chain and sprocket wheel device 15 connected to the gear device and the drive sprocket wheel. The shaft upon which is mounted the drive sprocket wheel is journalled in the bracket 16 extending from the trailing edge of the lead leaf. The linear member 10 is a roller chain meshing with the drive sprocket wheel 13 and secured at its leading end to the anchor 17 at the leading edge of the leaf 2 and at its trailing end to the anchor 18 which is adjustably secured to the bracket 19 extending from the trailing edge of the leaf 2. To secure an effective driving engagement between the drive sprocket wheel 13 and the roller chain 10, I have provided the idler sprocket wheels 20 and 21 on the bracket 16 and engaging the roller chain.

The electric motor is completely housed within the lead leaf 1, as is most of the gear device 14. The roller chains and sprocket wheels of the chain and sprocket wheel device 15 and the roller chain 10 are located at the inside of the lead leaf 1 and the adjacent leaf 2.

The second mechanism dependent upon the relative movement of the leaves 1 and 2 for moving all of the leaves 1, 2, 3 and 4 to open and closed positions comprises the series of cables 22, 23 and 24 for moving the leaves to open position, and the series of cables 25, 26 and 27 for moving the leaves to closed position.

The cable 22 is connected at its leading end to the anchor 28 inside the lead leaf 1 and extends through the trailing edge of the lead leaf and over the spool 29 on the lead leaf and the sheave 30 on the leaf 2 and then through the trailing edge of the leaf 2 to the anchor bracket 31 on the leaf 3. The spool 29 is mounted on the bracket 32 which extends from the trailing edge of the lead leaf, the sheave 30 is mounted at the leading edge of the leaf 2 and the anchor bracket 31 extends from the trailing edge of the leaf 3. The cable 23 is connected at its leading end to the anchor 33 inside the leaf 2 and extends through the trailing edge of this leaf and over the spool 34 on the leaf 2 and the sheave 35 on the leaf 3 and then through the trailing edge of this leaf to the anchor bracket 36. The spool 34 is mounted on the bracket 37 which extends from the trailing edge of the leaf 2, the sheave 35 is mounted at the leading edge of the leaf 3 and the anchor bracket 36 extends from the trailing edge of the leaf 4. The cable 24 is connected at its leading end to the anchor 38 mounted inside the leaf 3 and extends through the trailing edge of this leaf and over the spool 39 on this leaf and the sheave 40 mounted on the leaf 4 and then through the trailing edge of the leaf 4 to the anchor bracket 41 secured to a buttress within the door pocket of the airplane hangar. The spool 39 is mounted on the anchor bracket 31 and the sheave 40 is mounted at the leading edge of the leaf 4.

The cable 25 is connected at its leading end to the anchor 42 mounted inside the lead leaf 1 and extends through the trailing edge of the lead leaf and over the sheave 43 mounted on the bracket 44 extending from the trailing edge of the leaf 2 and to the anchor 45 mounted on the leaf 3 at its leading edge. The cable 26 is connected at its leading end to the anchor 46 mounted within the leaf 2 and extends through the trailing edge of this leaf and over the sheave 47 on the bracket 48 extending from the trailing edge of the leaf 3 and to the anchor 49 at the leading edge of the leaf 4. The cable 27 is connected at its leading end to the anchor 50 mounted inside the leaf 3 and extends through the trailing edge of this leaf and over the sheave 51 on the bracket 52 extending from the trailing edge of the leaf 4 and to the anchor 53 forming part of the buttress adjacent the jamb. The buttress is located within the door pocket of the airplane hangar.

Assuming the door leaves to be in closed position, it will be seen that when the electric motor is started to rotate the drive sprocket wheel 13 in a counter-clockwise direction it moves over the roller chain 10 and moves the lead leaf 1 from its closed position toward its open position relative to the leaf 2. When this happens, tension is induced in all of the cables 22, 23 and 24 through the anchors and anchor brackets to which the cables are connected and the sheaves and spools over which the cables run, compelling the leaves 1, 2, 3 and 4 to move simultaneously toward open position. The movement of the leaves is differential and at rates substantially proportional to the distances between the open and closed positions of the respective leaves, so that all of them arrive substantially simultaneously at open position. To move the leaves from open position to closed position, the drive sprocket wheel is rotated in a clockwise direction to move the lead leaf toward its closed position, and this movement induces tension in all the cables 25, 26 and 27 through their anchors and anchor brackets and their sheaves and spools, so that all of the leaves 1, 2, 3 and 4 are simultaneously differentially moved to closed position to arrive substantially simultaneously at their respective closed positions.

Figure 10:
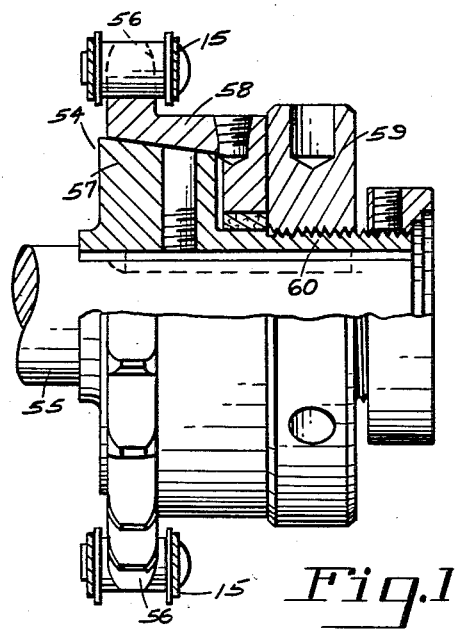
Figure 10 is an enlarged cross section on the line 10—10 of Figure 5.

For the purpose of providing for hand operation of the door leaves, in the event of power failure, I have provided the clutch 54 between the driven shaft 55 of the gear device 14, and the driving sprocket wheel 56 of the chain and sprocket wheel device 15. This clutch, as shown in Figure 10, comprises the cone 57 keyed to the driven shaft 55, the carrier 58 for the sprocket wheel 56 having an inner surface for fitting the outer surface of the cone, and the nut 59, threaded on the hub 60 of the cone and holding the carrier in firm engagement with the cone.

Figure 11:
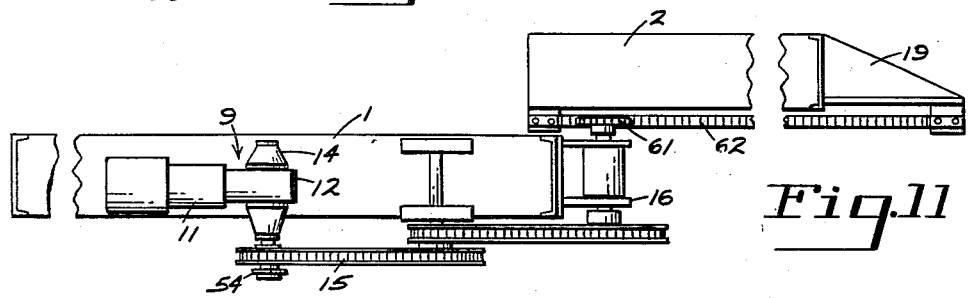
Figure 11 is a view similar to a portion of Figure 5 showing a modification.

As shown in Figure 11, the drive unit has the drive pinion 61 and the rack 62 is mounted on the leaf adjacent the lead leaf in mesh with the drive pinion to effect the relative movement of these leaves through the electric motor and speed reducing mechanism.

Figure 12:
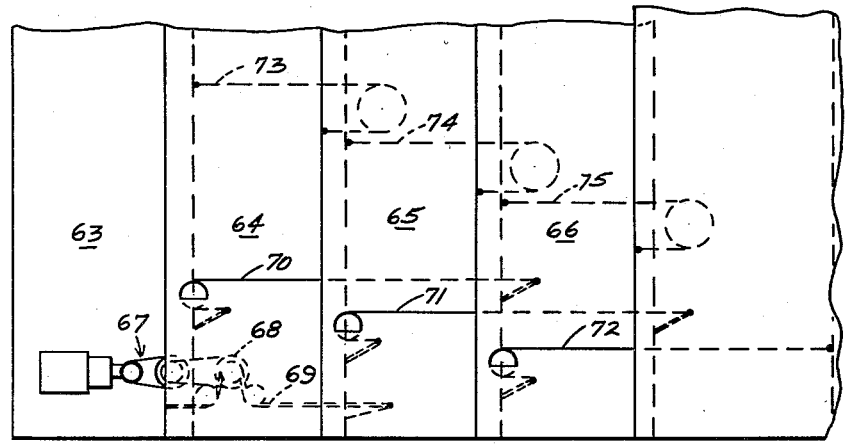
Figure 12 is a schematic inside elevation of a portion of a modified door operating system.
Figure 13:
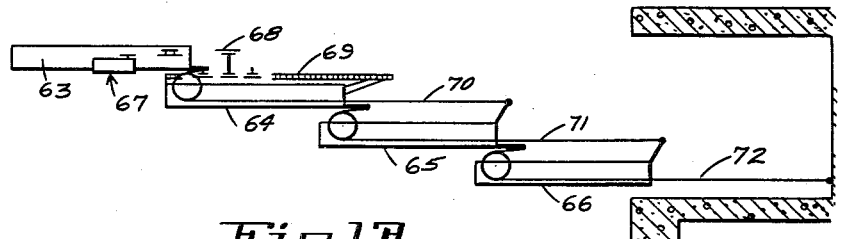
Figures 13 and 14 are schematic plan views of the door opening cables and door closing cables respectively which form part of the door operating system of Figure 12.
Figure 14:
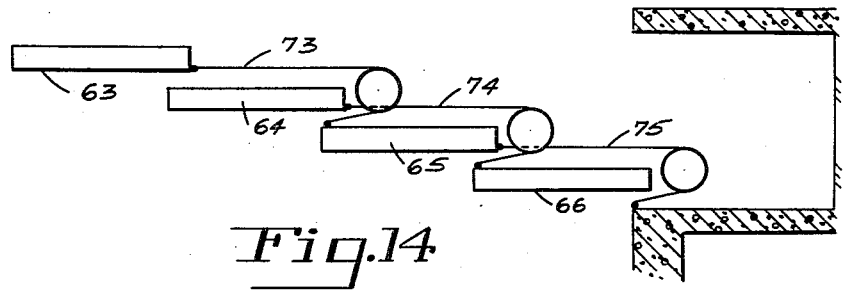

In the modified construction of door operating mechanism illustrated in Figures 12, 13 and 14, the door leaves 63, 64, 65 and 66 are located at the outside of the airplane hanger with the trailing leaf nearest and the lead leaf farthest from the hangar. The construction of the drive unit 67 including the drive sprocket wheel 68 and the roller chain 69 in driving engagement with the drive sprocket wheel is the same as shown in Figures 1 to 10, inclusive, except that the roller chain is on the outside of the leaf 64. The arrangement of the opening cables 70, 71 and 72 and the closing cables 73, 74 and 75 is also the same as shown in Figures 1 to 10, inclusive, except they extend at the outside of the leaves.

Figure 15:
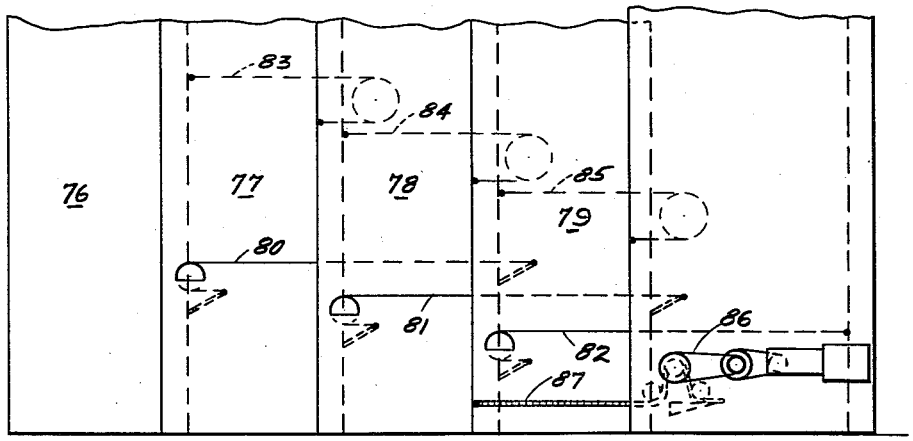
Figures 15, 16 and 17 are views similar to Figures 12, 13 and 14 respectively showing another modified door operating system.
Figure 16:
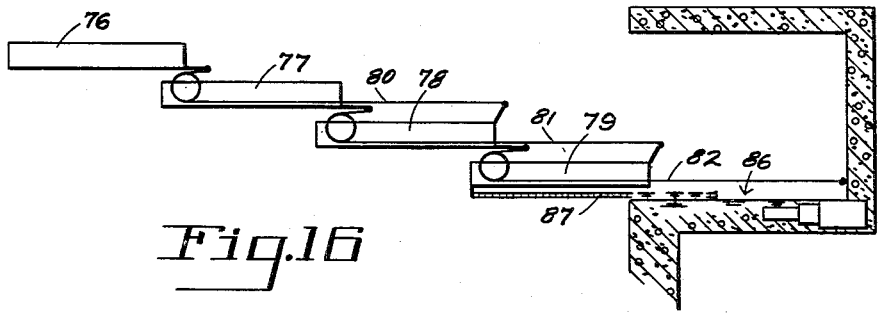
Figure 17:
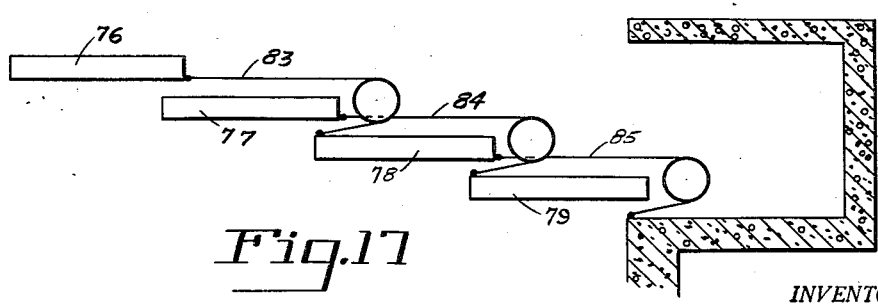

Figures 15, 16 and 17 show another modified construction in which the door leaves 76, 77, 78 and 79 and the opening cables 80, 81 and 82 and the closing cables 83, 84 and 85 are arranged in the same manner as shown in Figures 12, 13 and 14. While the construction of the drive unit 86 and the roller chain 87 is the same as shown in Figures 12, 13 and 14, the drive unit is mounted on the airplane hangar and the roller chain is mounted on the inside of the trailing or jamb leaf 79.

Figure 18:
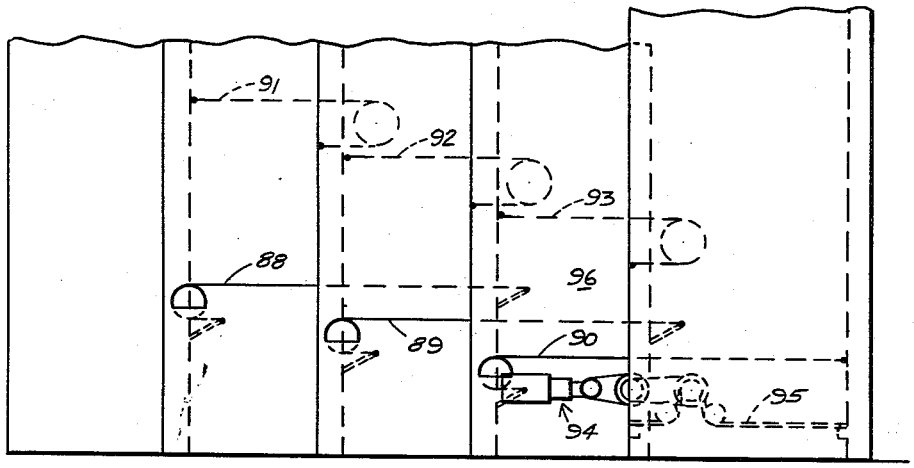
Figures 18, 19 and 20 are views similar to Figures 12, 13 and 14 respectively showing another modified door operating system.
Figure 19:
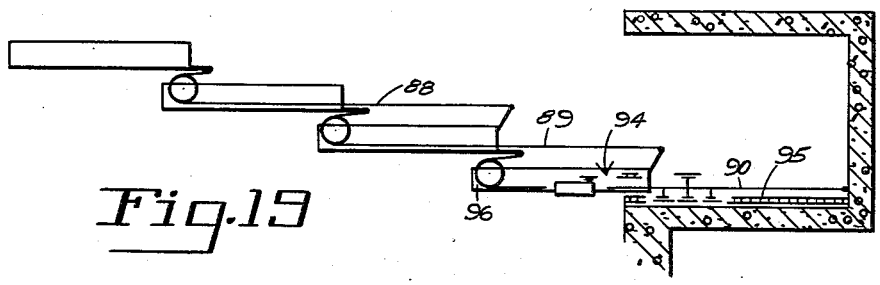
Figure 20:
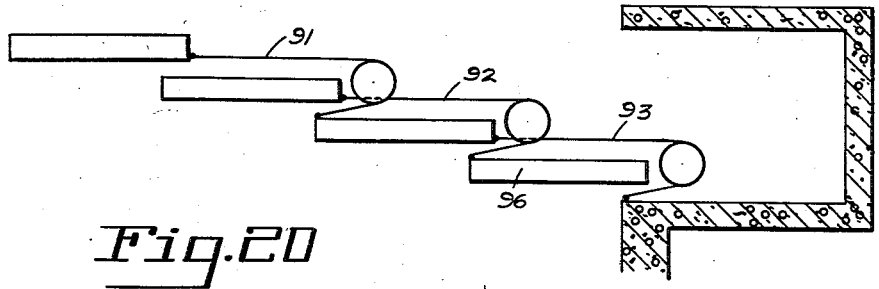

Figures 18, 19 and 20 show an operating system having the opening cables 88, 89 and 90, the closing cables 91, 92 and 93, the drive unit 94 and the roller chain 95 constructed in the same manner as shown in Figures 15, 16 and 17 but differing in mounting the drive unit 94 on the trailing or jamb leaf 96 and in mounting the roller chain 95, which is in driving engagement with the drive sprocket wheel of the drive unit, entirely on the airplane hangar.

Figure 21:
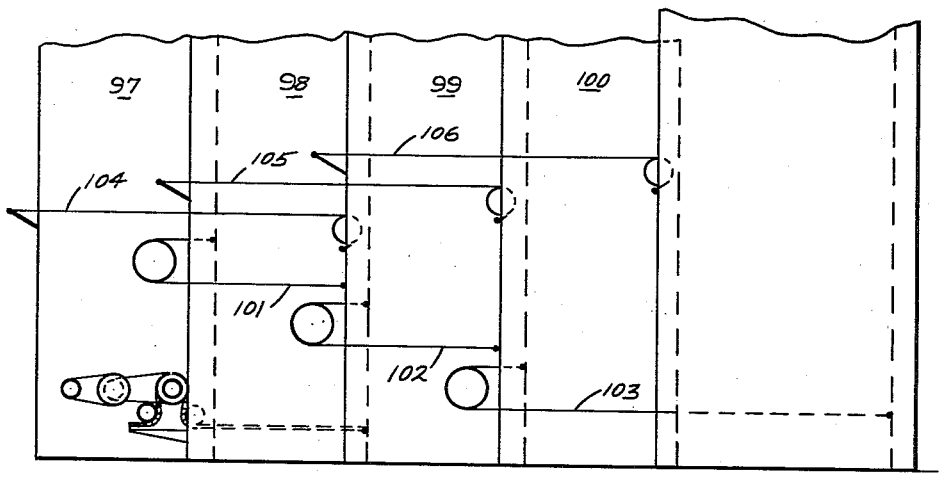
Figures 21, 22 and 23 are views similar to Figures 12, 13 and 14 respectively showing another modified door operating system.
Figure 22:
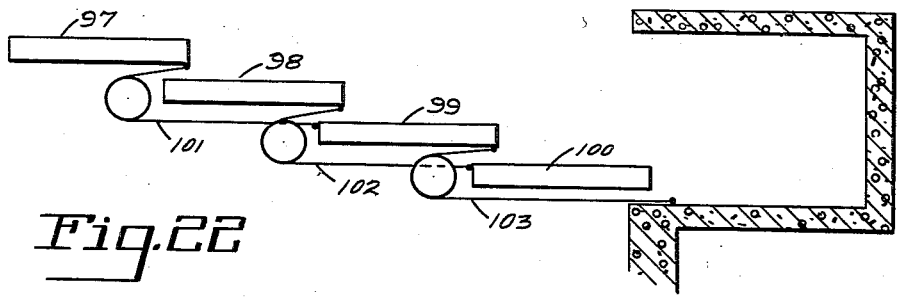
Figure 23:
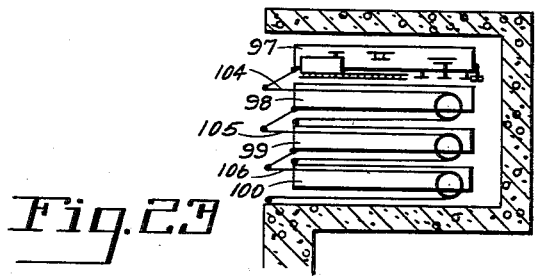

As shown in Figures 21, 22 and 23, the arrangement of the leaves 97, 98, 99 and 100 is similar to that of Figures 12, 13 and 14 but the opening cables 101, 102 and 103 and the closing cables 104, 105 and 106 are on the inside of the airplane hangar and the brackets for the sheaves over which the opening cables run and also the anchor brackets for the leading ends of the closing cables extend from the leading edges of the leaves.

In all of these modifications, the operation is the same.

Furthermore, the pinion and rack construction shown in Figure 11 may be used.

What I claim as my invention is:

1. In a door operating system, a door comprising at least three leaves movable simultaneously differentially in opposite directions along a predetermined path to arrive substantially simultaneously at fully open and fully closed positions respectively, roller supporting members for supporting said leaves for movement along said path, an electric motor on one of said leaves between its upper and lower edges, cooperating members other than said roller supporting members on and between the upper and lower edges of said motor carrying leaf and an adjacent leaf for relatively moving said two last mentioned leaves along said path in opposite directions, one of said cooperating members being driven by said motor and the other of said cooperating members being in positive driving engagement with the said one of said cooperating members, a stationary anchor, and means connected to all of said leaves and to said anchor and dependent upon relative movement of said two last mentioned leaves along said path toward open position for simultaneously differentially moving all of said leaves along said path toward open position and dependent upon relative movement of said two last mentioned leaves along said path toward closed position for simultaneously differentially moving all of said leaves along said path toward closed position, said moving means moving said leaves at rates substantially proportional to the distances between the open and closed positions of the respective leaves.

2. In a door operating system, a door comprising at least three leaves movable simultaneously differentially in opposite directions along a predetermined path to arrive substantially simultaneously at fully open and fully closed positions respectively, means for supporting said leaves for movement along said path, a motor mounted on one of said leaves and connected to an adjacent leaf for relatively moving said two last mentioned leaves along said path in opposite directions, and means connected to all of said leaves and dependent upon relative movement of said two last mentioned leaves along said path toward open position for simultaneously differentially moving all of said leaves along said path toward open position and dependent upon relative movement of said two last mentioned leaves along said path toward closed position for simultaneously differentially moving all of said leaves along said path toward closed position, said moving means moving said leaves at rates substantially proportional to the distances between the open and closed positions of the respective leaves.

References Cited in the file of this patent

UNITED STATES PATENTS

| | | |
|---|---|---|
| 1,244,899 | Rosentreter | Oct. 30, 1917 |
| 1,838,491 | Martin | Dec. 29, 1931 |
| 1,960,860 | Allen | May 29, 1934 |
| 2,373,023 | Goodwin | Apr. 3, 1945 |
| 2,425,016 | Weaver | Aug. 5, 1947 |
| 2,553,511 | Casey | May 15, 1951 |
| 2,628,090 | Verdier | Feb. 10, 1953 |